US 6,869,020 B2

United States Patent
Foth et al.

(10) Patent No.: US 6,869,020 B2
(45) Date of Patent: Mar. 22, 2005

(54) METHOD FOR FIELD PROGRAMMABLE RADIO FREQUENCY IDENTIFICATION TESTING DEVICES FOR TRANSMITTING USER SELECTED DATA

(75) Inventors: Thomas J. Foth, Trumbull, CT (US); Brian M. Romansky, Monroe, CT (US); Jeffrey D. Pierce, Sandy Hook, CT (US); Andrei Obrea, Seymour, CT (US); Anand V. Chhatpar, Madison, WI (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 10/430,925

(22) Filed: May 7, 2003

(65) Prior Publication Data

US 2004/0074958 A1 Apr. 22, 2004

Related U.S. Application Data

(60) Provisional application No. 60/419,316, filed on Oct. 18, 2002.

(51) Int. Cl.[7] .......................... G06K 19/06; G06K 7/10; G06K 19/00
(52) U.S. Cl. ................... 235/492; 235/462.46; 235/487
(58) Field of Search ............................. 235/375, 462.46, 235/487, 492; 340/10.1, 10.5, 10.51, 10.52; 178/18.01; 307/125

(56) References Cited

U.S. PATENT DOCUMENTS

| | | | |
|---|---|---|---|
| 4,889,961 A | * | 12/1989 | Carlson ..................... 174/261 |
| 5,962,834 A | | 10/1999 | Markman |
| 6,018,299 A | * | 1/2000 | Eberhardt ................ 340/572.7 |
| 6,111,506 A | | 8/2000 | Yap et al. |
| 6,436,516 B1 | | 8/2002 | Nagashima et al. |
| 6,480,100 B1 | | 11/2002 | Frieden et al. |
| 6,557,768 B2 | | 5/2003 | Yap et al. |
| 6,628,199 B1 | * | 9/2003 | Ehrensvärd et al. ..... 340/568.1 |
| 2001/0006194 A1 | | 7/2001 | Kayanakis et al. |

FOREIGN PATENT DOCUMENTS

| | | |
|---|---|---|
| DE | 19947180 A1 | 4/2001 |
| DE | 20106542 U1 | 7/2001 |
| JP | 02003037522 A | 2/2003 |
| WO | WO 01/91045 A1 | 11/2001 |

\* cited by examiner

Primary Examiner—Thien M. Le
Assistant Examiner—April A. Taylor
(74) Attorney, Agent, or Firm—Ronald Reichman; Angelo N. Chaclas

(57) ABSTRACT

A method that allows one to mark information with a pencil on paper equipped with a RFID type circuit, and have the marked information represent answers to questions or queries. The marked entered information may be corrected by erasing the written information with a pencil eraser and writing new information on the paper with a pencil.

28 Claims, 12 Drawing Sheets

METHOD FOR FIELD PROGRAMMABLE RADIO FREQUENCY IDENTIFICATION TESTING DEVICES FOR TRANSMITTING USER SELECTED DATA

This Application claims the benefit of the filing date of U.S. Provisional Application No. 60/419,361 filed Oct. 18, 2002, which is owned by the assignee of the present Application.

CROSS REFERENCE TO RELATED APPLICATIONS

Reference is made to commonly assigned co-pending patent applications Ser. No. 10/431,066 filed herewith entitled "METHOD FOR FIELD PROGRAMMABLE RADIO FREQUENCY DOCUMENT IDENTIFICATION DEVICES" in the names of Anand V. Chhatpar, Jeffrey D. Pierce, Brian M. Romansky, Thomas J. Foth, and Andrei Obrea; Ser. No. 10/430,911 filed herewith entitled "METHOD FOR FIELD PROGRAMMING RADIO FREQUENCY IDENTIFICATION DEVICES THAT CONTROL REMOTE CONTROL DEVICES" in the names of Jeffrey D. Pierce, Brian M. Romansky, Thomas J. Foth, and Anand V. Chhatpar; Ser. No. 10/430,922 filed herewith entitled "METHOD FOR FIELD PROGRAMMABLE RADIO FREQUENCY IDENTIFICATION DEVICES TO PERFORM SWITCHING FUNCTIONS" in the names of Andrei Obres, Brian M. Romansky, Thomas J. Foth, Jeffrey D. Pierce, and Anand V. Chhatpar; Ser. No. 10/430,926 filed herewith entitled "METHOD FOR FIELD PROGRAMMING RADIO FREQUENCY IDENTIFICATION LABELS" in the names of Thomas J. Foth, Brian M. Romansky, Jeffrey D. Pierce, and Anand V. Chhatpar; Ser. No. 10/431,067 filed herewith entitled "METHOD FOR FIELD PROGRAMMING RADIO FREQUENCY IDENTIFICATION RETURN FORMS" in the names of Jeffrey D. Pierce, Thomas J. Foth, Brian M. Romansky, Andrei Obrea, and Anand V. Chhatpar; and Ser. No. 10/430,597 filed herewith entitled "METHOD AND APPARATUS FOR FIELD PROGRAMMING RADIO FREQUENCY IDENTIFICATION DEVICES" in the names of Brian M. Romansky, Thomas J. Foth, Jeffrey D. Pierce, Andrei Obrea, and Anand V. Chhatpar.

FIELD OF THE INVENTION

This invention pertains to electronic circuits and, more particularly, to programmable radio frequency identification testing devices.

BACKGROUND OF THE INVENTION

From the invention of paper thousands of years ago to the present date, paper has been used as the preferred medium by individuals and societies for the recording, processing and storage of information. With the introduction of computers into society, many of the functions previously performed exclusively with paper are now being accomplished by writing information on paper and entering the written information into a computer. Typically, the information written on paper is entered into computers by optically scanning the paper. The foregoing method of entering information into computers is inconvenient, because the paper must be placed directly on the scanner, and no intervening objects may be placed between the paper and the scanner. Another method utilized by the prior art for writing information on paper and entering the written information into a computer involved placing a piece of paper over an expensive digitizing pad and using a special pen that produced digital data by indicating the coordinates of the digitizing pad. Thus, heretofore, there was no economic, convenient way for wirelessly entering information written on plain paper into a computer.

Another method utilized by the prior art for entering information into a computer involved the use of radio frequency identification (RFID) tags. The RFID tags were programmed to contain digital information either during the manufacturing of the read only memory portion of the RFID integrated circuit, or in the field using electromagnetic radio frequency signals to store information in the nonvolatile memory portion of the RFID tag. One of the difficulties involved in the utilization of RFID tags was that if an end user wanted to enter information into the RFID tag, the end user had to use a specialized device that communicated with the RFID tag through a radio frequency. Another problem involved in the utilization of RFID tags that were programmed by the manufacturer was that the end user had to share the information that was going to be programmed into the RFID tag with the manufacturer of the tag.

An additional method utilized by the prior art for the scoring of multiple-choice and/or true or false tests, i.e., Scholastic Aptitude Tests, involved depositing graphite information by a pencil on specific portions of the card that was electrically read, based upon the conductivity of the deposited graphite. The prior art also used card readers to electrically and optically read punched cards to enter information into systems. The prior art also optically read markings on a page.

Bar codes have been used in a wide variety of applications as a source for information. Typically, bar codes are used at a point-of-sale terminal in merchandising for pricing and inventory control. Bar codes are also used in controlling personnel access systems, mailing systems, and in manufacturing for work-in-process and inventory control systems, etc. The bar codes themselves represent alphanumeric characters by series of adjacent stripes of various widths or lengths, i.e., the Universal Product Code, planet codes, etc.

A bar code is a set of binary numbers. It consists of black bars and white spaces. A wide black bar space signifies a one, and a thin black bar or space signifies a zero. The binary numbers stand for decimal numbers or letters. There are several different kinds of bar codes. In each one, a number, letter or other character is formed by a certain number of bars and spaces.

Bar code reading systems or scanners have been developed to read bar codes. The bar code may be read by having a light beam translated across the bar code and a portion of the light illuminating the bar code is reflected and collected by a scanner. The intensity of the reflected light is proportional to the reflectance of the area illuminated by the light beam. This light is converted into an electric current signal, and then the signal is decoded.

SUMMARY OF THE INVENTION

This invention overcomes the disadvantages of the prior art by providing a method that allows one to mark information with a pencil or conductive ink on a material equipped with a RFID type circuit, and have the marked information represent answers to questions or responses to queries that are stored in the RFID circuit. The material may be any cellulose type product, i.e., paper, cardboard, chipboard, wood or plastic, fabric, animal hide, etc. The marked entered information may be corrected by erasing the written information with a pencil eraser and writing new information on the paper with a pencil.

This invention accomplishes the foregoing by utilizing the RFID serial number generation portion of the RFID circuit that is used when the RFID circuit is being read. In the prior art, the bits used to encode one's and zero's into the generation portion of the RFID circuit were typically fixed. This invention utilizes the serial number generation portion of the RFID circuit by exposing on a piece of paper some or all of the bits left open or closed to represent a binary values, i.e., ones or zeros. A user may complete the RFID serial number storage portion of the RFID circuit by filling in the space between the connections with a pencil to alter the binary values. Alternatively, the serial number generation portion of the RFID circuit may be exposed on a piece of paper with all of the connections made, and a user may break a space between the connections with a sharp instrument or hole punch to alter the binary values. Alternatively, the serial number generation portion of the RFID circuit may have some of the bits all ready left open or closed to represent a unique number.

An additional advantage of this invention is that a RFID type circuit may be combined with marked information that is stored in a RFID circuit, wherein the marked information also forms a bar code.

A further advantage of this invention is that when a business mailer receives a business reply envelopes and/or prepaid or customer paid post cards from their customers, they do not have to open the envelope or scan the post card to determine what information the customer is sending.

BRIEF DESCRIPTION OF THE DRAWINGS

FIG. 10 is a drawing of a train ticket that indicates the stop that someone contracted with the train company to be transported to;

DETAILED DESCRIPTION OF THE PREFERRED EMBODIMENT

Figure 1:
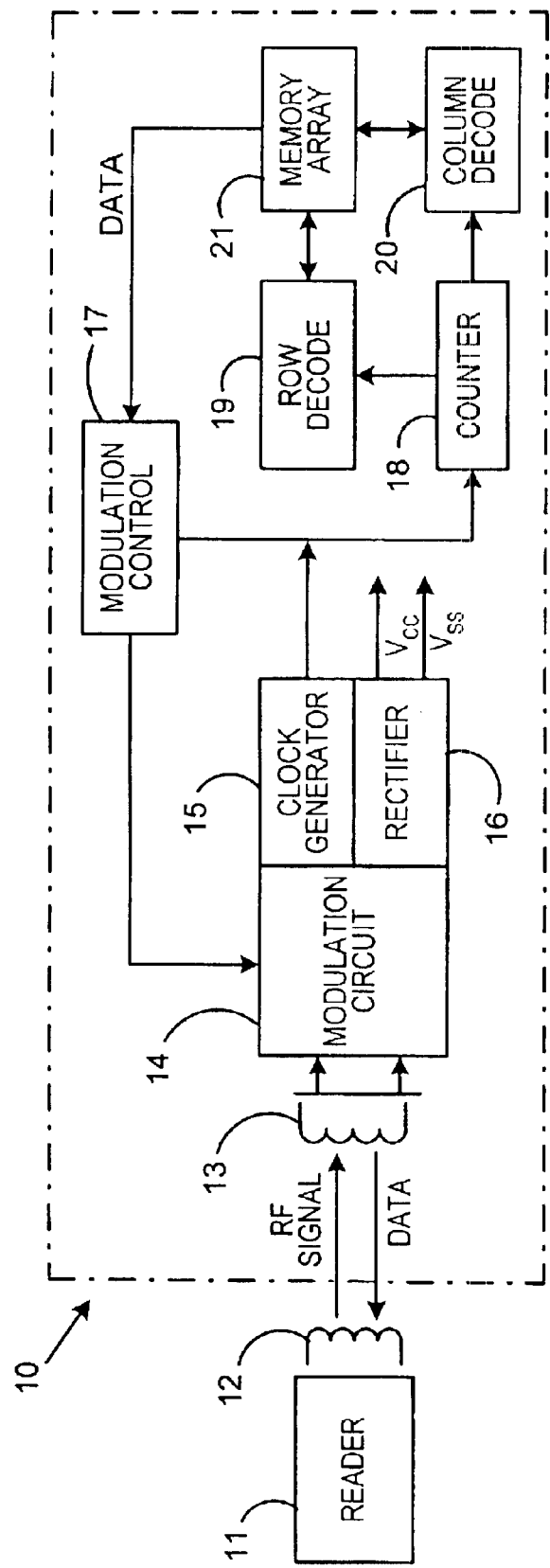
FIG. 1 is a block diagram of a prior art RFID circuit.

Referring now to the drawings in detail, and more particularly to FIG. 1, the reference character 10 represents a prior art RFID circuit. Circuit 10 may be the model MCRF 200 manufactured by Microchip Technology, Inc. of 2355 West Chandler Blvd, Chandler, Ariz. 85224. RFID reader 11 is connected to coil 12, and 12 is coupled to coil 13. Coil 13 is connected to modulation circuit 14. Modulation circuit 14 is connected to clock generator 15 and rectifier 16. Modulation control 17 is coupled to modulation circuit 14, clock generator 15 and counter 18. Counter 18 is coupled to column decode 20. Row decode 19 is coupled to memory array 21, and array 21 is coupled to modulation control 17. It would be obvious to one skilled in the art that a battery may be used to supply power to circuit 10.

Reader 11 has a transmitter mode and a receiver mode. During the transmit mode of reader 11, reader 11 transmits a radio frequency signal for a burst of time via coil 12. After the transmission of a signal by reader 11, reader 11 turns into a receiver. Coil 12 is inductively linked with coil 13, and coil 13 receives the radio frequency signal from coil 12 and converts the aforementioned signal into inductive energy, i.e., electricity. When coil 13 has sufficient energy, coil 13 will cause clock generator 15 to generate timing pulses which drive counter 18. Counter 18 drives row decode 19 which causes memory array 21 to read the fixed bit data pattern stored in memory array 21 one bit at a time. As the data bits are being read by array 21, the data bits are transmitted to modulation control circuit 17. Control circuit 17 sends the data bits to reader 11 via modulation circuit 14 and coils 13 and 12.

Figure 2A:
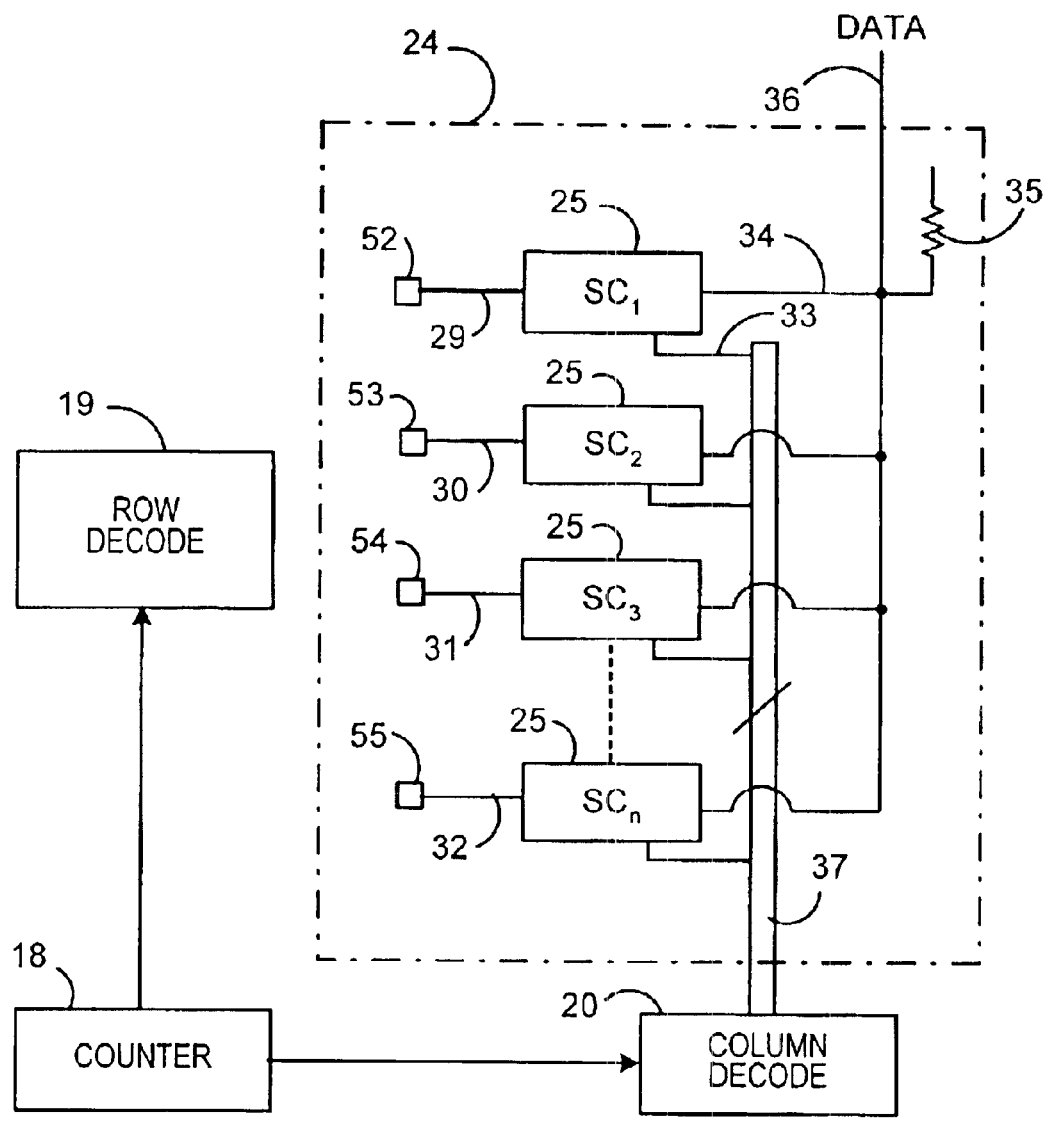
FIG. 2A is a drawing of a circuit 24 that replaces memory array 21 of FIG. 1 showing how programming of the bits may be accomplished by making the bits externally available for programming RFID circuit 10.

FIG. 2A is a drawing of a circuit 24 that replaces memory array 21 of FIG. 1 showing how programming of the bits may be accomplished by making the bits externally available for programming RFID circuit 10. A plurality of sensor circuits 25 is contained in circuit 24. Sensor circuits 25 are labeled $SC_1$ $SC_2$ $SC_3$ . . . $SC_n$. Line 29 is connected to $SC_1$ and graphite contact 52 and line 30 is connected to $SC_2$ and graphite contact 53. Line 31 is connected to $SC_3$ and graphite contact 54 and line 32 are connected to $SC_n$ and graphite contact 55. There is a sensor circuit 25 for each graphite contact. The description of FIG. 4 will describe how information may be entered into circuit 24 via graphite contacts 52–55. $SC_1$ has an input 33, which enables the data output 34. Input 33 is connected to one of the n lines 37, and data output 34 is connected to data line 36 and pull up resistor 35. Data line 36 is connected to modulation control 17 (FIG. 1).

When counter 18 selects the value 1, column decode 20 will enable line 33, which will cause the same logic level that is on graphite contact 52 to be placed on data output 34. When line 33 is not selected, the value on graphite contact 52 does not have any influence on the data output line 34. Enable outputs 33 for $SC_1$ . . . $SC_n$ are bundled together in lines 37 so that only one line 37 is turned on at a time. Lines 37 are connected to column decode 20. Column decode 20 is connected to counter 18, and counter 18 is connected to row decode 19. Counter 18 generates a sequence of numbers from 1 through n to enable a different line 37 in sequential order. Thus, data line 36 will receive the data outputs 34 from $SC_1$ . . . $SC_n$ at different times.

Figure 2B:
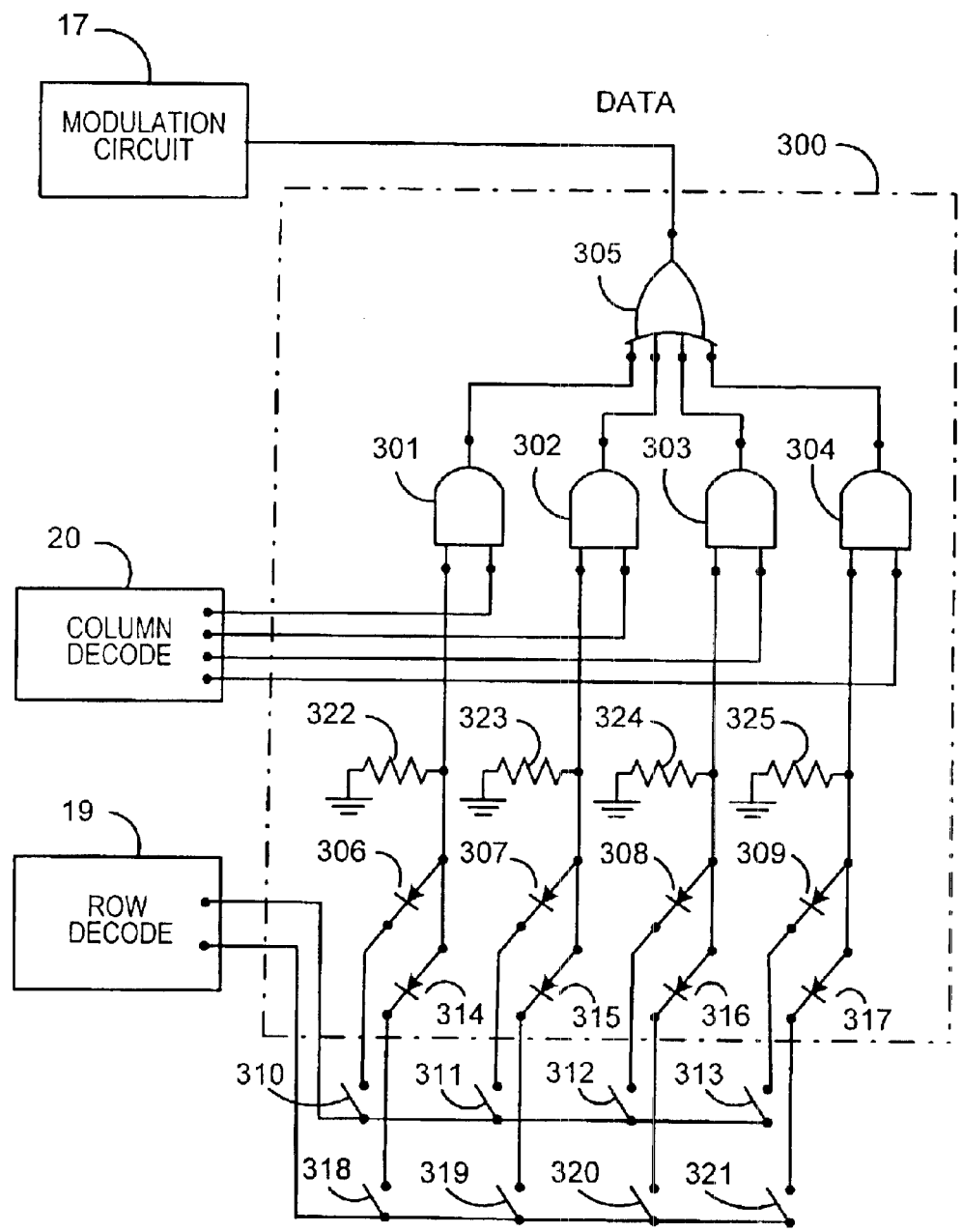
FIG. 2B is a drawing of a circuit 300 that is an alternate representation of circuit 24, that replaces memory array 21 of FIG. 1 showing how programming of the bits may be accomplished by making the bits externally available for programming RFID circuit 10.

FIG. 2B is a drawing of a circuit 300 that is an alternate representation of circuit 24, that replaces memory array 21 of FIG. 1 showing how programming of the bits may be accomplished by making the bits externally available for programming RFID circuit 10. Circuit 300 includes AND gates 301, 302, 303 and 304 and OR gate 305.

One of the inputs of AND gate 301 is connected to column decode 20 and the other input to AND gate 301 is connected to one of the ends of resistor 322, one of the ends of diode 306 and one of the ends of diode 314. The other end of resistor 322 is connected to ground. The other end of diode 306 is connected to one of the terminals of toggle switch 310, and the other end of toggle switch 310 is connected to row decode 19. The other end of diode 314 is connected to one of the terminals of toggle switch 318, and the other end of toggle switch 318 is connected to row decode 19.

One of the inputs of AND gate 302 is connected to column decode 20, and the other input to AND gate 302 is connected to one of the ends of resistor 323, one of the ends of diode 307 and one of the ends of diode 315. The other end of resistor 323 is connected to ground. The other end of diode 307 is connected to one of the terminals of toggle switch 311, and the other end of toggle switch 311 is connected to row decode 19. The other end of diode 315 is connected to one of the terminals of toggle switch 319, and the other end of toggle switch 319 is connected to row decode 19.

One of the inputs of AND gate 303 is connected to column decode 20, and the other input to AND gate 303 is connected to one of the ends of resistor 324, one of the ends of diode 308 and one of the ends of diode 316. The other end of resistor 324 is connected to ground. The other end of diode 308 is connected to one of the terminals of toggle switch 312, and the other end of toggle switch 312 is connected to row decode 19. The other end of diode 316 is connected to one of the terminals of toggle switch 320, and the other end of toggle switch 320 is connected to row decode 19.

One of the inputs of AND gate 304 is connected to column decode 20, and the other input to AND gate 304 is connected to one of the ends of resistor 325, one of the ends of diode 309 and one of the ends of diode 317. The other end of resistor 325 is connected to ground. The other end of diode 309 is connected to one of the terminals of toggle switch 313, and the other end of toggle switch 312 is connected to row decode 19. The other end of diode 317 is connected to one of the terminals of toggle switch 321, and the other end of toggle switch 321 is connected to row decode 19.

Column decode 20 and row decode 19 function by taking the selected output at logic one, i.e., a high level and keeping all the other outputs at logic zero, i.e., a low level. The output of AND gates 301–304 are connected to the input of OR gate 305, and the output of OR gate 305 is data that is connected to the input of modulation circuit 17. If switches 310, 311, 312 and 313, respectively, remain open, AND gates 301–304, respectively, will have a "zero" output. If switches 310, 311, 312 and 313, respectively, are closed, AND gates 301–304, respectively, will have a "one" output. The output of AND gates 301–304, respectively, will be read when switches 318–321, respectively, are closed.

Figure 3:
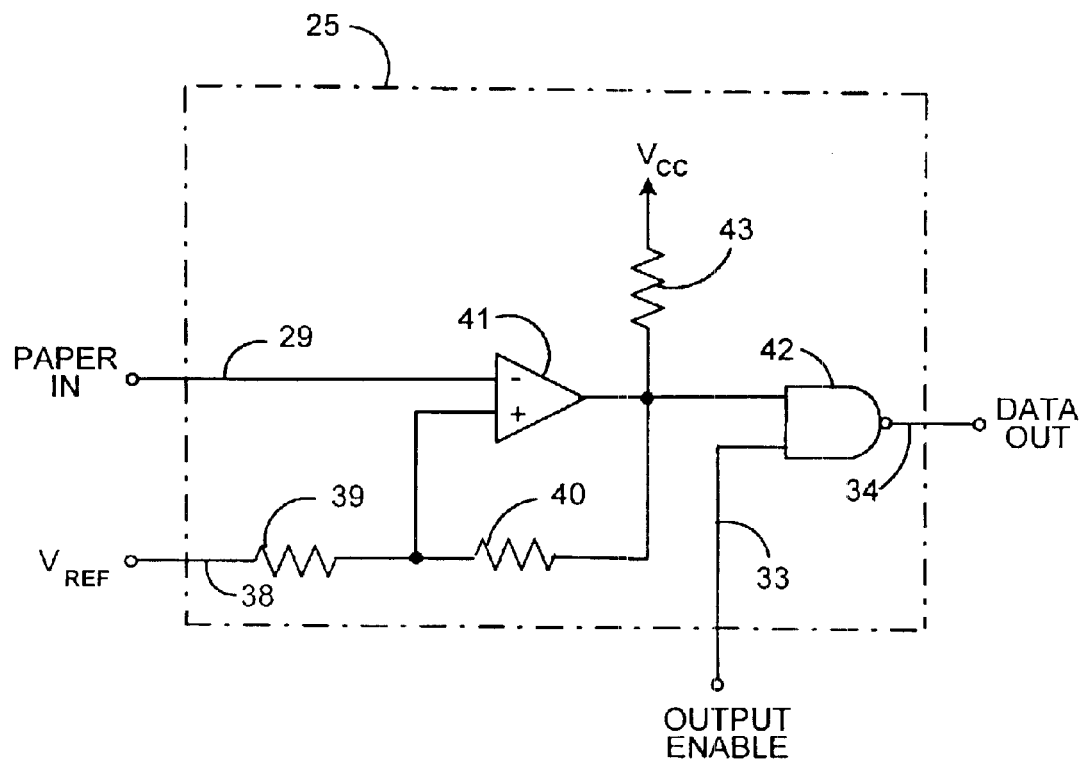
FIG. 3 is a drawing showing sensor circuit 25 of FIG. 2A in greater detail.

FIG. 3 is a drawing showing sensor circuit 25 of FIG. 2A in greater detail. The negative input of comparator 41 is connected to line 29, and the positive input of comparator 41 is connected to line 38. Comparator 41 may be a LM339N comparator. One end of line 38 is connected to a 2–3 volt reference voltage, and the other end of line 38 is connected to one of the ends of resistor 39. The other end of resistor 39 is connected to the positive input of comparator 41 and one of the ends of resistor 40. The other end of resistor 40 is connected to the input of NAND gate 42, the output of comparator 41 and one of the ends of resistor 43. The other end of resistor 43 is connected to a source voltage to act as a pull up resistor. The other input to NAND gate 42 is enable output 33. The output of gate 42 is data output 34. Resistor 39 may be 47,000 ohms, and resistor 40 may be 470,000 ohms. Resistor 43 may be 1,000 ohms. Comparator 41 has a positive feedback to provide a small amount of hysteresis Sensor circuit 25 is a differential circuit that accommodates variations in the conductivity of the conductive material. The conductive material may be used as a voltage divider to produce $V_{ref}$ on line 38 under the same conditions experienced by $paper_{in}$ on line 29. Thereby, nullifying the effects of varying resistance in the conductive material. It will be obvious to one skilled in the art that sensor circuit 25 may replace switches 310–313 and 318–321 of FIG. 2B.

Figure 4:
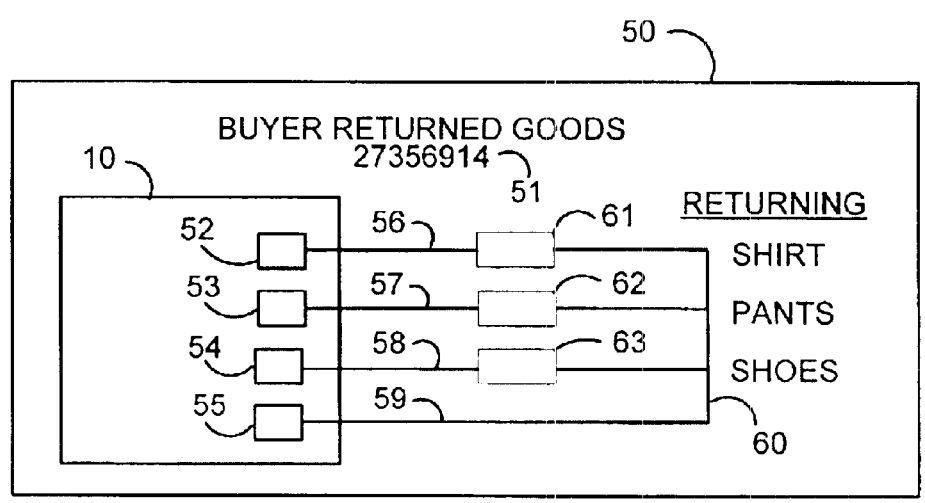
FIG. 4 is a seller furnished form to be completed by a buyer returning goods to a seller.

FIG. 4 is a seller-furnished form to be completed by a buyer returning goods to a seller. RFID circuit 10 is attached to paper 50 by means of a conductive adhesive such as an anisotropic adhesive (not shown). The seller places a returned goods identification number 51 on the form to identify the buyer by writing the invoice number for the purchased goods on paper 50 in a manner that number 51 may be read by a RFID reader. Graphite contacts 52, 53, 54 and 55 and lines 56, 57, 58, 59 and 60 are printed on standard bond paper, standard photocopier paper, standard computer paper, etc., by a standard computer printer like the model Desk Jet 880C printer manufactured by Hewlett Packard using a Hewlett Packard 45 black ink cartridge.

If the buyer decides to return a shirt to the seller, the buyer uses a graphite pencil, i.e., number 2, HB, etc., or a Paper Mate® black ball point pen to fill in rectangle 61. If the buyer decides to return pants to the seller, the buyer fills in rectangle 62 with a graphite pencil, and if the buyer decides to return shoes to the seller, the buyer fills in rectangle 63 with a graphite pencil. If the buyer changes his/her mind regarding the goods to be returned or makes a mistake in filling in one of the rectangles, the buyer could erase the penciled marking in the rectangle with a pencil eraser so that a RFID reader would only read what the buyer indicated on the finished form. The buyer would insert the finished form into a package (not shown) containing the returned goods, and the seller would be able to read the completed form when he/she receives the package with a RFID read without opening the package.

Figure 5:
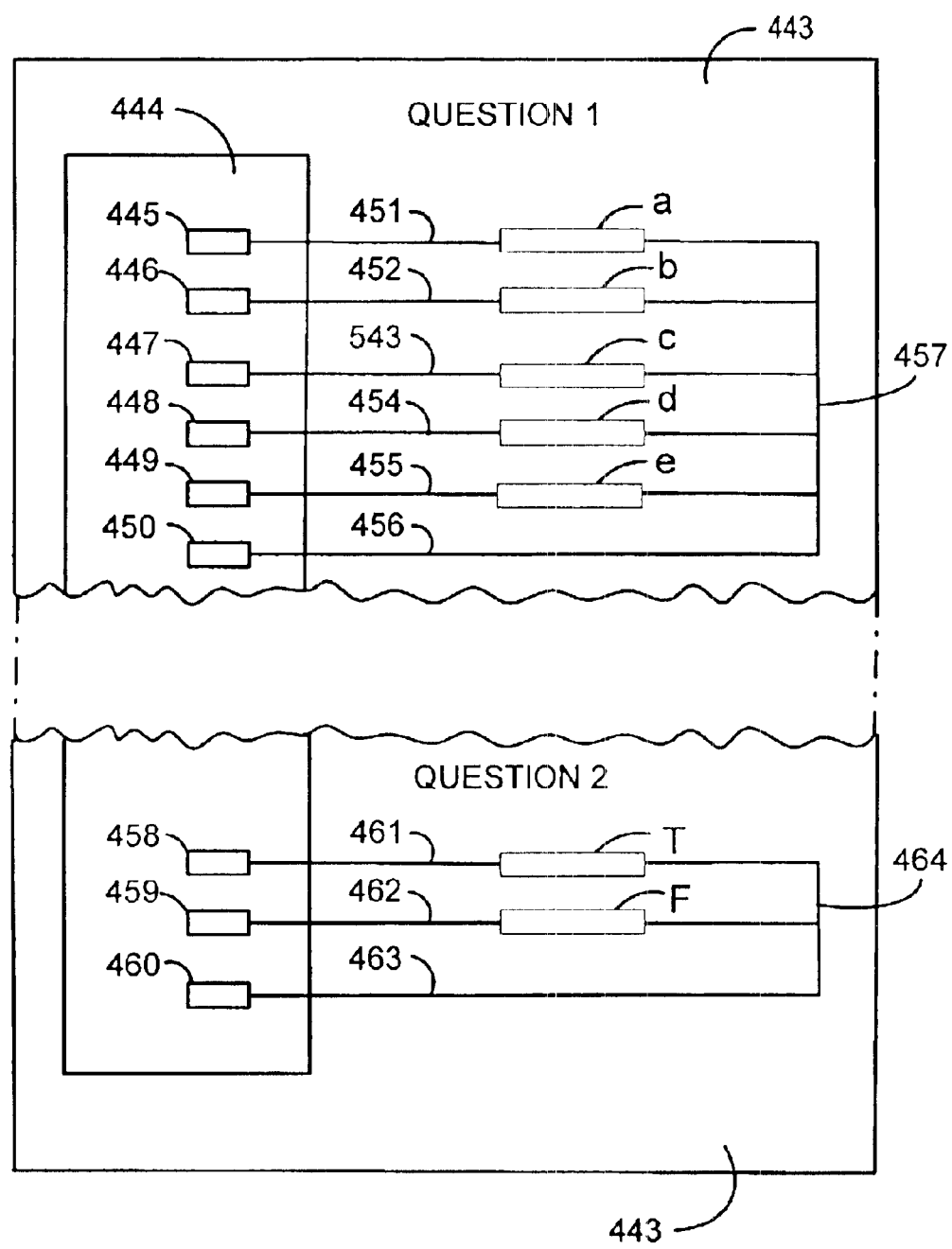
FIG. 5 is a drawing showing how a modified RFID circuit may be attached to a piece of paper in order to permit a user to answer examination questions.

FIG. 5 is a drawing showing how a modified RFID circuit may be attached to a piece of paper to permit a user to answer examination questions. RFID circuit 444 is attached to paper 443 by means of an adhesive (not shown). RFID circuit 444 is the same as RFID circuit 10 with circuit 24 replacing memory array 21 of FIG. 1 with different graphite contacts. Graphite contacts: 445, 446, 447, 448, 449 and 450, lines 451, 452, 453, 454, 455, 456 and 457 are printed on paper 443 by a standard computer printer like the model Desk Jet 880C printer manufactured by Hewlett Packard using a Hewlett Packard 45 black ink cartridge or a Hewlett Packard laser printer. Rectangle "a" appears on line 451, and rectangle "b" appears on line 452. Rectangle "c" appears on line 453, and rectangle "d" appears on line 454. Rectangle "e" appears on line 455. Lines 451–455 represent possible answers to a question on an examination. If a student thought the answer to the question were choice "c", the student would use a pencil to fill in the rectangle "c" on line 453.

Graphite contacts 458, 459 and 460 and lines 461, 462 and 463 are printed on paper 443 by a standard computer printer like the model Desk Jet 880C printer manufactured by Hewlett Packard using a Hewlett Packard 45 black ink cartridge or a Hewlett Packard laser printer. Rectangle "T" appears on line 461, and rectangle "F" appears on line 462. If a student thought the answer to the question was "true" the student would use a pencil to fill in the rectangle "T" on line 461.

A teacher may use a RFID reader not shown to monitor the student's progress on a test and note the questions that the students are answering incorrectly.

Figure 6:
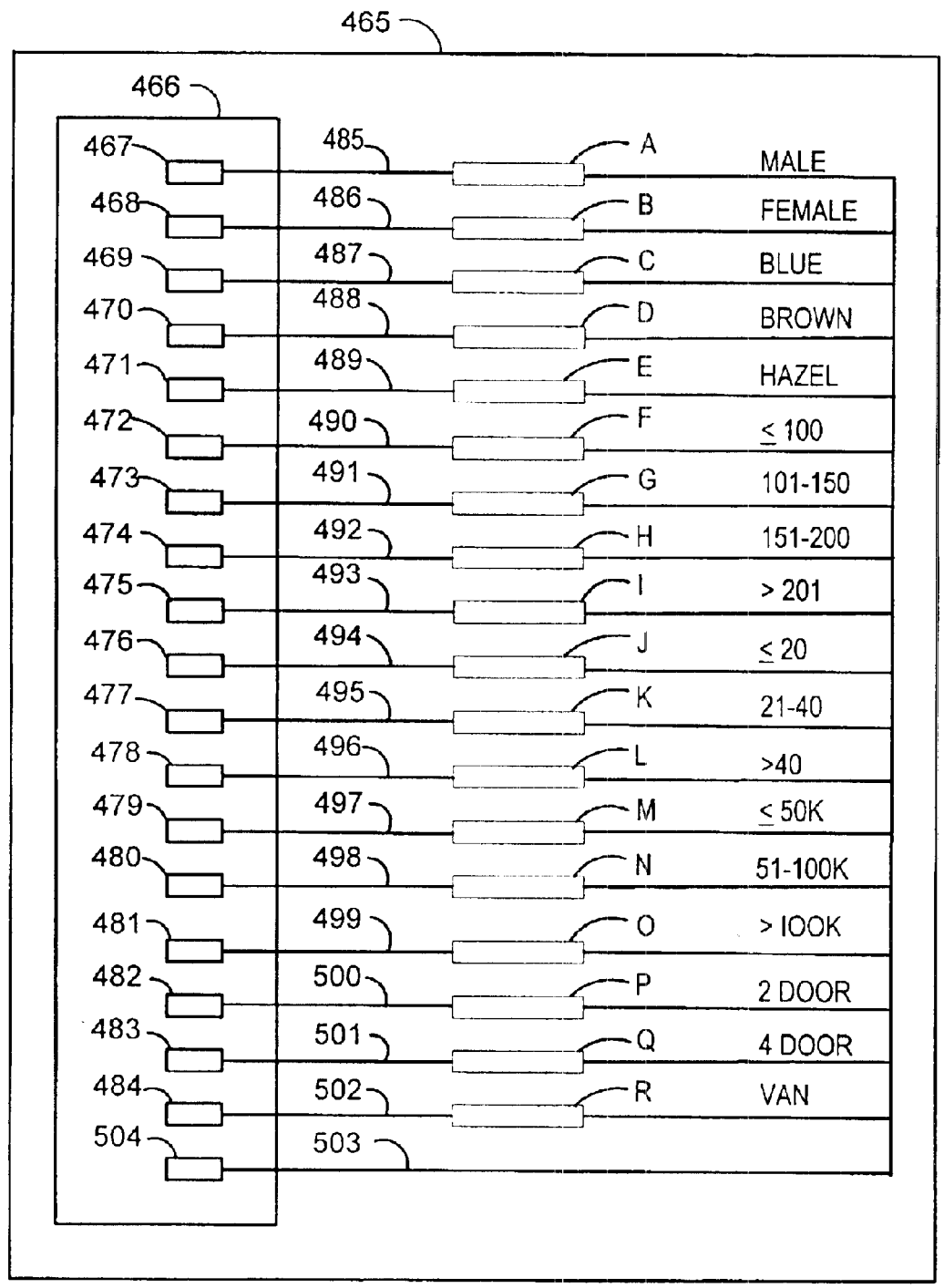
FIG. 6 is a drawing showing how a modified RFID circuit may be attached to a piece of paper in order to permit a user to answer various types of questions.

FIG. 6 is a drawing showing how a modified RFID circuit may be attached to a piece of paper in order to permit a user to answer various types of questions. RFID circuit 466 is attached to paper 465 by means of an adhesive (not shown). RFID circuit 466 is the same as RFID circuit 10 with circuit 24 replacing memory array 21 of FIG. 1 with different graphite contacts. Graphite contacts: 467–484 and 504, lines 485–503 are printed on paper 465 by a standard computer printer like the model Desk Jet 880C printer manufactured by Hewlett Packard using a Hewlett Packard 45 black ink cartridge.

Rectangle "A" appears on line 485, which is connected to contact 467 and rectangle "B" appears on line 486, which is connected to contact 468. Rectangle "C" appears on line 487, which is connected to contact 469 and rectangle "D" appears on line 488, which is connected to contact 470. Rectangle "E" appears on line 489, which is connected to contact 471 and rectangle F is connected to line 490 which is connected to contact 472. Rectangle "G" appears on line 491, which is connected to contact 473 and rectangle "H" appears on line 492, which is connected to contact 474. Rectangle "I" appears on line 493, which is connected to contact 475 and rectangle "J" appears on line 494, which is connected to contact 476. Rectangle "K" appears on line 495, which is connected to contact 477 and rectangle "L" is connected to line 496 which is connected to contact 478. Rectangle "M" appears on line 497, which is connected to contact 479 and rectangle "N" appears on line 498, which is connected to contact 480. Rectangle "O" appears on line 499, which is connected to contact 481 and rectangle "P" appears on line 500, which is connected to contact 482. Rectangle "Q" appears on line 501, which is connected to contact 483 and rectangle R is connected to line 502 which is connected to contact 484. Line 503 is connected to contact 504.

If the user is a male, the user uses a graphite pencil, i.e., number 2, HB, etc., or a Paper Mate® black ball point pen to fill in rectangle "A". If the user has blue eyes and weighs 160 pounds, the user uses a graphite pencil, i.e., number 2, HB, etc., or a Paper Mate® black ball point pen to fill in rectangles "C" and "H". If the user is forty-two years old and earns over $100,000 a year the user uses a graphite pencil, i.e., number 2, HB, etc., or a Paper Mate® black ball point pen to fill in rectangles "L" and "O". If the user is reporting a four door sedan vehicle, the user uses a graphite pencil, i.e., number 2, HB, etc., or a Paper Mate® black ball point pen to fill in rectangle "P".

An observer may use a RFID reader not shown to monitor the user's progress in answering the questions.

If the user changes his/her mind regarding the answer to one of the questions or makes a mistake in filling in one of the rectangles, the user could erase the penciled marking in the rectangle with a pencil eraser so that a RFID reader would only read what the user indicated last.

Figure 7:
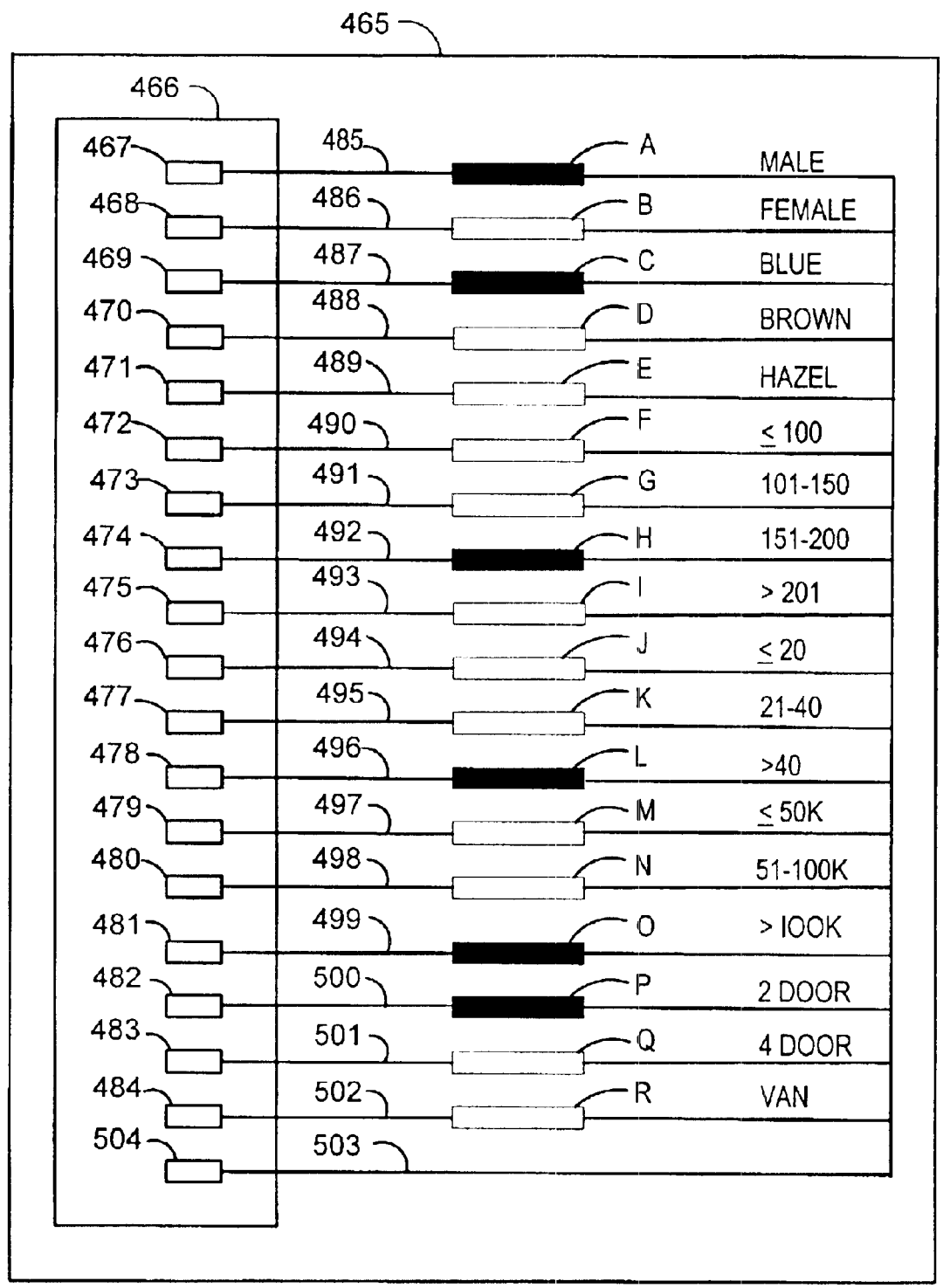
FIG. 7 is a drawing showing how a modified RFID circuit of FIG. 6, stores information in the RFID circuit and how the RFID circuit forms a bar code.

FIG. 7 is a drawing showing how a modified RFID circuit of FIG. 6, stores information in the RFID circuit and how the RFID circuit forms a bar code. If someone decided to use a graphite pencil, i.e., number 2, HB, etc., or a Paper Mate® black ballpoint pen to fill in rectangles A, C, H, L, O and P. Rectangles A, would represent a binary one of a bar code, and a closed circuit will exist between contact 467, line 485, line 503, and contact 504. Rectangle C would represent a binary one of a bar code, and a closed circuit will exist between contact 469, line 487, line 503, and contact 504. Rectangle H would represent a binary one of a bar code, and a closed circuit will exist between contact 474, line 492, line 503, and contact 504. Rectangle L would represent a binary one of a bar code, and a closed circuit will exist between contact 478, line 496, line 503, and contact 504. Rectangle O would represent a binary one of a bar code, and a closed circuit will exist between contact 481, line 499, line 503, and contact 504. Rectangle P would represent a binary one of a bar code, and a closed circuit will exist between contact 482, line 500, line 503, and contact 504.

It would be obvious to one skilled in the art if rectangles B, D, E, F, G, I, J, K, M, N, O and R and were filled in with a graphite pencil, rectangles B, D, E, F, G, I, J, K, M, N, Q and R would represent binary ones; and, if rectangles A, C, H, L, O and P were not filled in with a graphite pencil, rectangles A, C, H, L, O and P would represent binary zeros. The lines and contacts connecting rectangles B, D, E, F, G, I, J, K, M, N, Q and R would be closed circuits, and the contacts connecting rectangles A, C, H, L, O and P would be open circuits.

Figure 8:
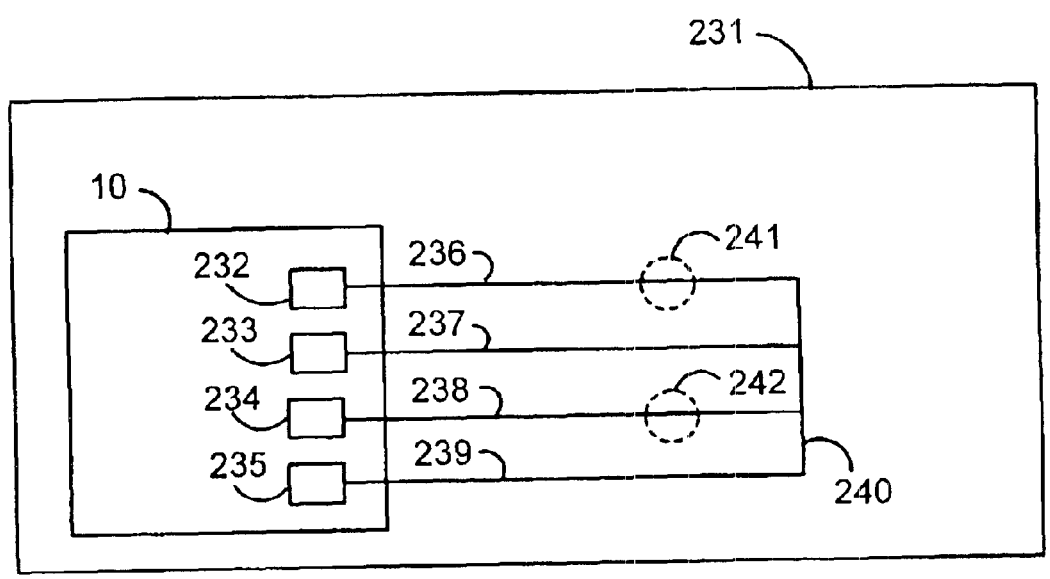
FIG. 8 is a drawing showing how a modified RFID circuit, attached to a piece of paper, provides information to the RFID circuit, and how holes punched in the RFID circuit forms a code that may be read by a optical reader.

FIG. 8 is a drawing showing how a modified RFID circuit attached to a piece of paper provides information to the RFID circuit and how holes punched in the RFID circuit form a code that may be read by an optical reader. RFID circuit 10 is attached to paper 231 by means of an adhesive (not shown). Graphite contacts 232, 233, 234 and 235, and lines 236, 237, 238, 239 and 240 are printed on paper 231 by a standard computer printer like the model Desk Jet 880C printer manufactured by Hewlett Packard using a Hewlett Packard 45 black ink cartridge. If a human user wanted to select the information represented by line 236, the user would make a hole 241 on line 236, and if the user wanted to select the information represented on line 238, the user would make a hole 242 on line 238. Lines 239, 240 and 236, hole 241 and contact 232 will form an open circuit. Lines 238, 240 and 239, hole 242 and contact 234 will form an open circuit. Light may be passed through holes 241 and 242 to repeat the information represented by lines 236 and 238.

Figure 9:
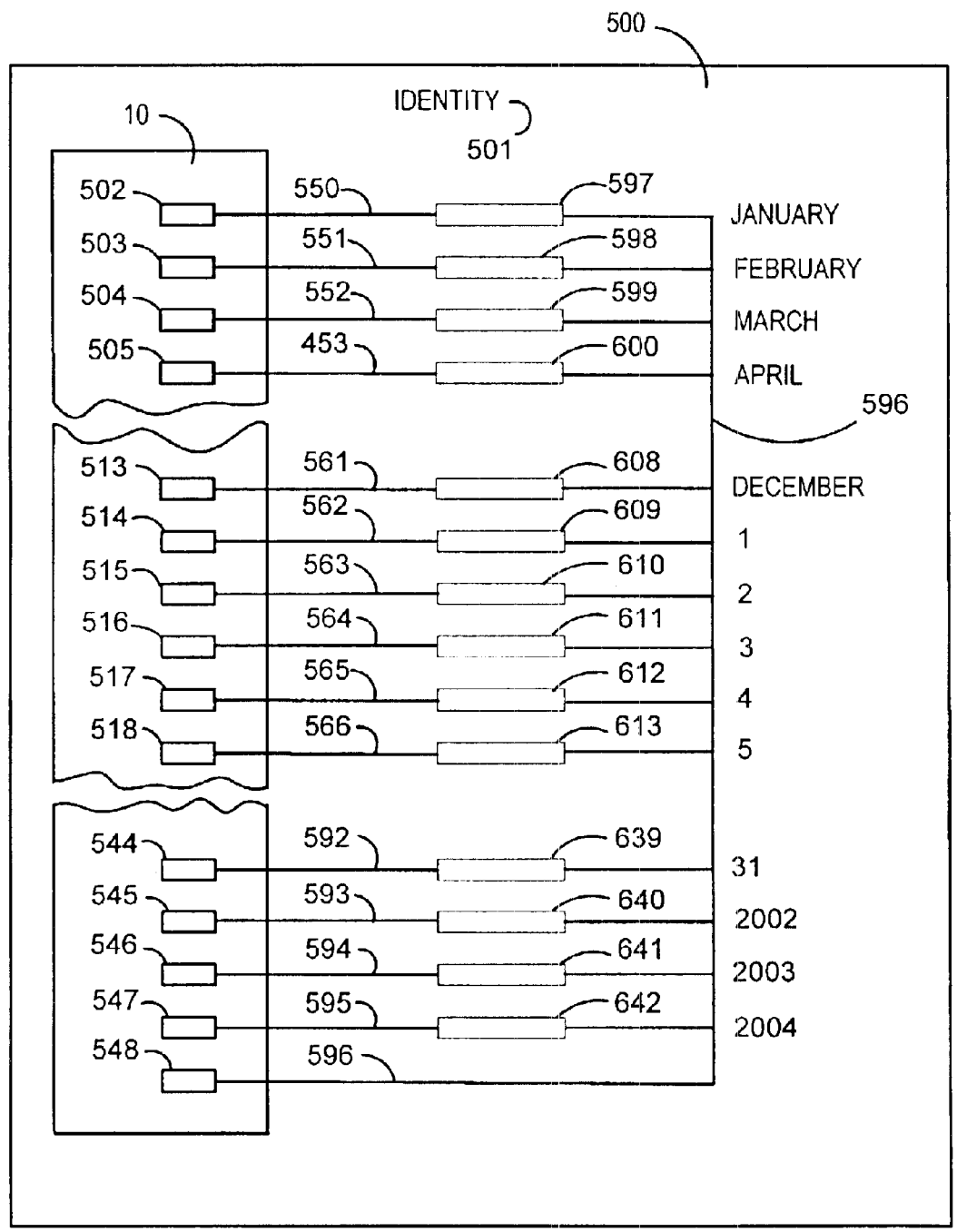
FIG. 9 is a drawing of a material 500 to be completed by a party that is keeping track of goods that may be date sensitive.

FIG. 9 is a drawing of a material 500 to be completed by a party that is keeping track of goods that may be date sensitive, i.e., food, film, medications, batteries, products that have certain shelf lives etc. Label 500 may be: attached to a container that the goods are contained in; affixed directly to the goods, or placed in a container that holds the goods. RFID circuit 10 is attached to material 500, by means of a conductive adhesive such as an anisotropic adhesive (not shown). The manufacturer, shipper and/or custodian of the goods may place the name, identity, and/or any other information relating to the goods in space 501. Graphite contacts 502–548 and lines 550–596 are printed on material 500 with a standard computer printer, like the model Desk Jet 880C printer manufactured by Hewlett Packard using a Hewlett Packard 45 black ink cartridge. The two vertical sides of rectangles 597–642 respectively are connected to lines 550–595. If the goods mentioned in identity 501 should be used before Mar. 3, 2004, someone may fill in rectangles 599, 611 and 642 with a graphite pencil and/or a ballpoint pen or if someone wanted to indicate that they received the goods on Feb. 1, 2002, they may fill in rectangles 598, 609 and 640 with a graphite pencil and/or a ballpoint pen.

Figure 10:
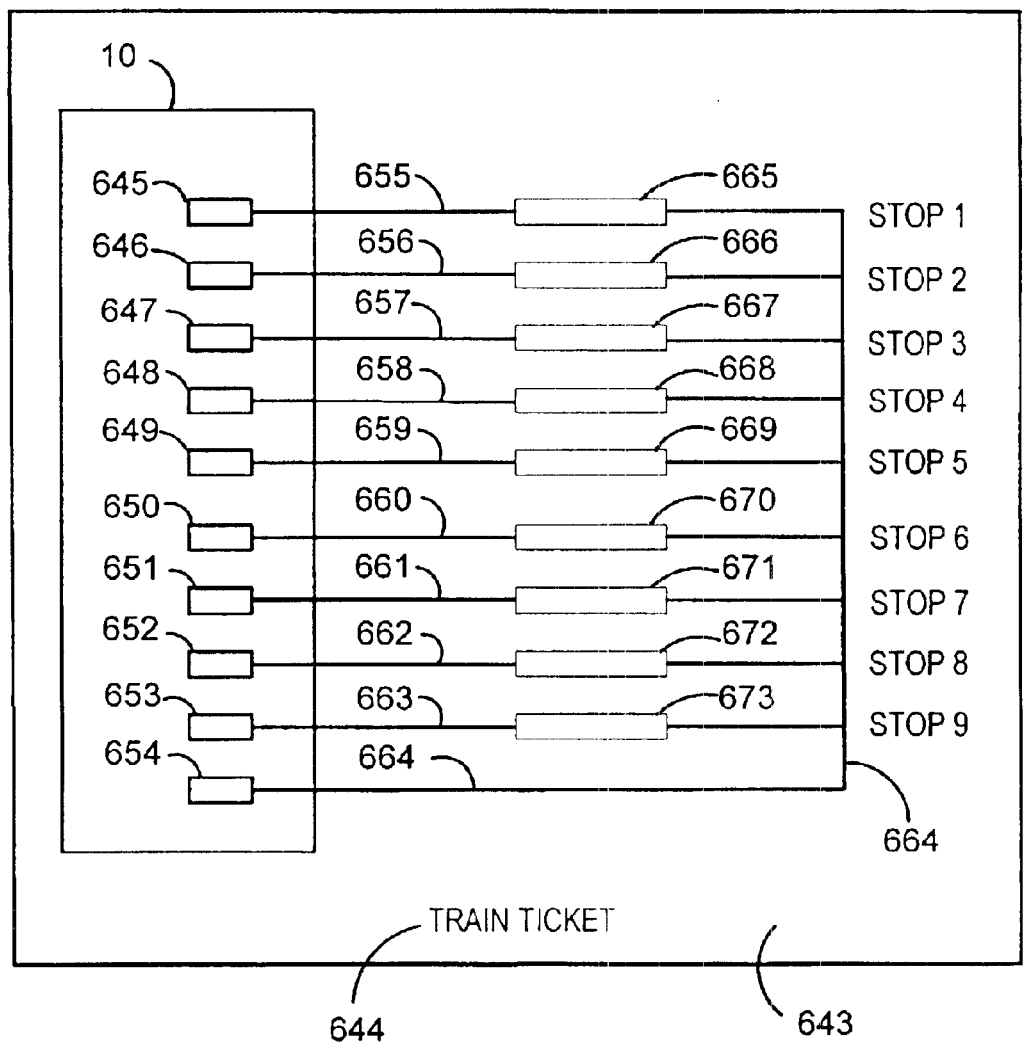

FIG. 10 is a drawing of a train ticket 644 that indicates the stop that someone contracted with the train company to be transported to. RFID circuit 10 is attached to material 643, by means of a conductive adhesive such as an anisotropic adhesive (not shown). An employee of the train company may indicate the stop that the customer paid to go to, i.e., Stop 6 by filling in rectangle 670 with a ballpoint pen or with a standard computer printer, like the model Desk Jet 880C printer manufactured by Hewlett Packard using a Hewlett Packard 45 black ink cartridge. Graphite contacts 645–664 and lines 655–664 are printed on material 643 with a standard computer printer, like the model Desk Jet 880C printer manufactured by Hewlett Packard using a Hewlett Packard 45 black ink cartridge. The two vertical sides of rectangles 665–673 respectively are connected to lines 655–663.

Figure 11:
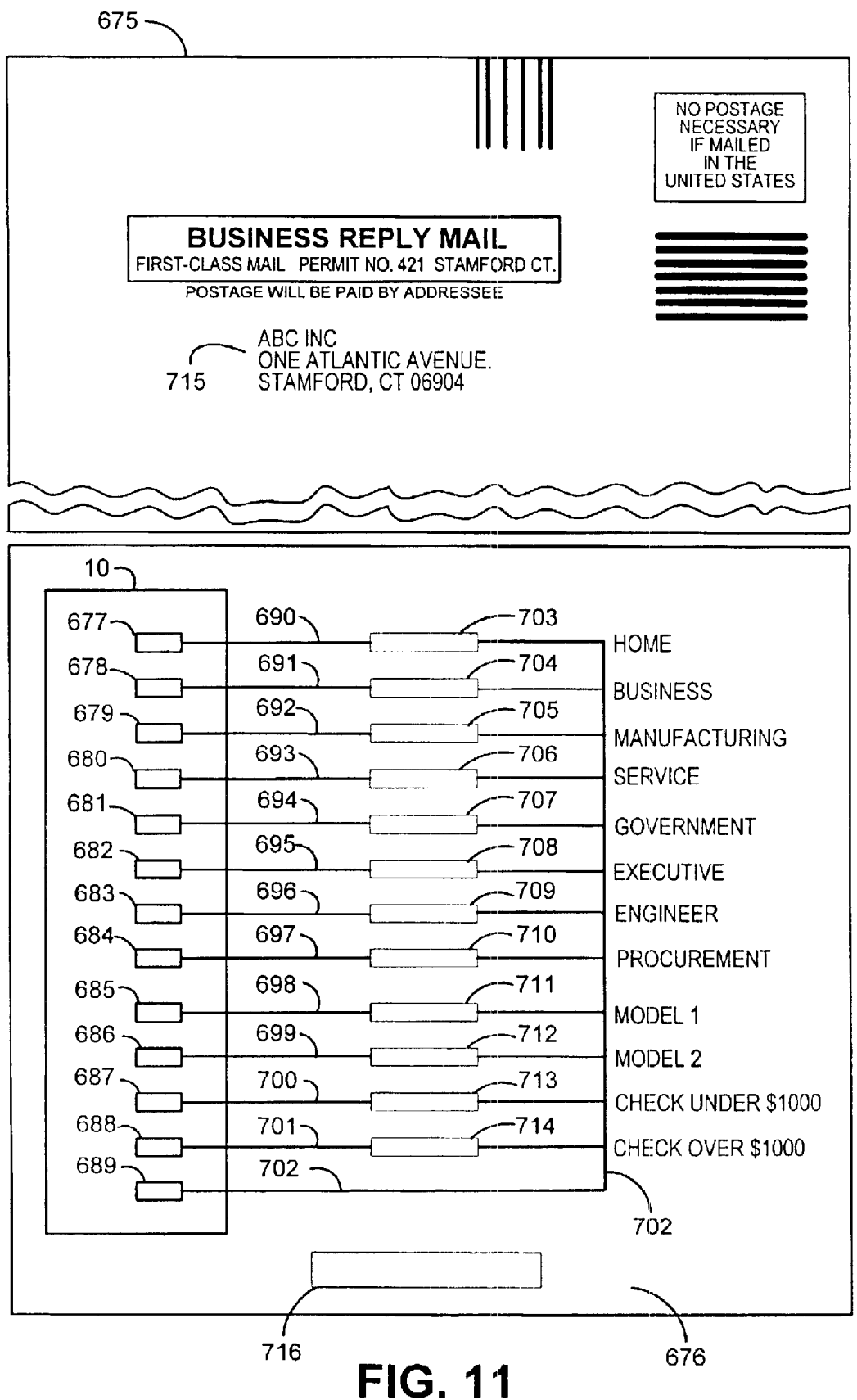
FIG. 11 is a drawing of the front of a business reply envelope and a modified RFID circuit that may be inserted into the envelope.

FIG. 11 is a drawing of the front of a business reply envelope and a modified RFID circuit that may be inserted into the envelope. Business Reply envelope 675 has the name and address 715 of the recipient of envelope written on the front panel of envelope 675. RFID circuit 10 is attached to material 676, by means of a conductive adhesive such as an anisotropic adhesive (not shown). A customer or potential customer of the recipient of envelope 675 may place their name, corporate identity, and/or any other information relating to questions asked on material 676 in space 716. Graphite contacts 677–689 and lines 690–702 are printed on material 676 with a standard computer printer, like the model Desk Jet 880C printer manufactured by Hewlett Packard using a Hewlett Packard 45 black ink cartridge. The two vertical sides of rectangles 703–714 respectively are connected to lines 690–701.

If the person answering the questions asked on material 676 purchased goods for their home, they would fill in rectangle 703 with a graphite pencil or ballpoint pen. If they purchased the goods for their manufacturing business, they would fill in rectangles 704 and 705 with a graphite pencil and/or a ballpoint pen or if they purchased the goods for their service business, they would fill in rectangles 704 and 706 with a graphite pencil and/or a ballpoint pen. If the goods were purchased for the government rectangle 707 would be filled in with a graphite pencil or ballpoint pen. The person answering the questions would fill in the one of the rectangles 709–710 to indicate their position. Rectangle 711 would be filled in with a graphite pencil or ballpoint pen to indicate model 1 and rectangle 712 would be filled in to indicate model 2. If a check for under $1,000 (not shown) is enclosed in envelope 675 rectangle 713, would be filled in with a graphite pencil and/or a ballpoint pen. If a check for over $1,000 (not shown) is enclosed in envelope 675 rectangle 714, would be filled in with a graphite pencil and/or a ballpoint pen.

Thus, the addressee of envelope 675 may use a RFID reader (not shown) to determine the answers to the questions indicated on material 676 without opening envelope 675. Hence, the addressee of envelope 675 may process the envelopes in an order that depends upon the answers to the questions posed on material 676. For instance, any material 676 that indicates a check for over $1,000 is enclosed will be processed first. It would be obvious to one skilled in the art that different questions may be asked on material 676 and/or a business reply card may be used with material 676 on its back surface.

Figure 12:
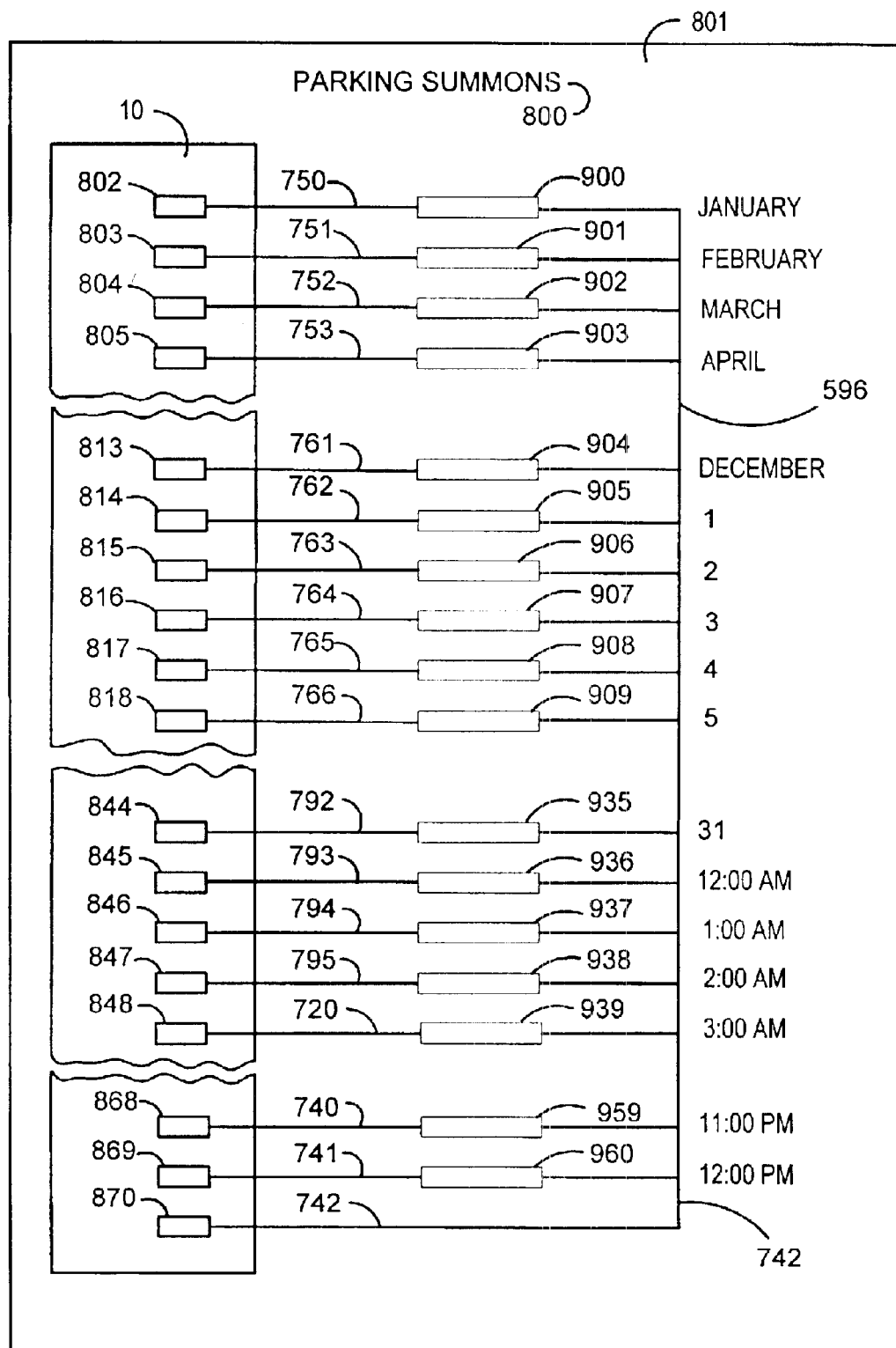
FIG. 12 is a drawing of a parking summons to be completed by authorized governmental personnel.

FIG. 12 is a drawing of a parking summons to be completed by authorized governmental personnel. RFID circuit 10 is attached to material 801, by means of a conductive adhesive such as an anisotropic adhesive (not shown). The authorized governmental personnel may place the name, identity of the automobile, and/or any other information relating to the parking infraction in space 800. Graphite contacts 802–870 and lines 750–795 and 720–742 are printed on material 801 with a standard computer printer, like the model Desk Jet 880C printer manufactured by Hewlett Packard using a Hewlett Packard 45 black ink cartridge or a Hewlett Packard laser printer. The two vertical sides of rectangles 900–960 respectively are connected to lines 750–795 and 720–742. If the parking summons was issued on March 4, at 11:00 PM, the authorized governmental personnel would fill in rectangles 902, 908 and 959 with a ballpoint pen.

The above specification describes a new and improved circuit and RFID type circuit that uses printed lines to perform the function of wires so that questions or queries may be answered by having an individual connect different printed wires by drawing a penciled line between the printed lines or by punching holes in the printed lines. It is realized that the above description may indicate to those skilled in the art additional ways in which the principles of this invention may be used without departing from the spirit. Therefore, it is intended that this invention be limited only by the scope of the appended claims.

What is claimed is:

1. A method for a user to answer questions or queries, said method includes the steps of:
   A) exposing on a material data bits of a radio frequency identification circuit (RFID) having a number generation portion of the RFID circuit in a manner that the data bits will represent answers to questions or queries that have been proposed to the user; and
   B) altering by the user on the material the data bits of the number generation portion of the RFID circuit in a manner that the altered bits will represent answers to some or all of the questions or queries proposed to the user.

2. The method claimed in claim 1, wherein the questions are examination questions.

3. The method claimed in claim 1, wherein the questions are question about the user.

4. The method claimed in claim 1, wherein the questions are questions about the users property.

5. The method claimed in claim 1, wherein the altering step further includes the step of:
   marking information on the material with a pencil to alter the bits.

6. The method claimed in claim 5, wherein the pencil is a graphite pencil.

7. The method claimed in claim 5, further including the step of:
   erasing the marked information to modify the information.

8. The method claimed in claim 5, further including the step of:
   punching holes in the marked information to modify the information.

9. The method claimed in claim 5, wherein the marked information is a bar code.

10. The method claimed in claim 1, wherein the recording step further includes the step of:
    marking information on the material with a ball point pen to alter the bits.

11. The method claimed in claim 10, further including the step of:
    erasing the marked information to modify the information.

12. The method claimed in claim 10, further including the step of:

punching holes in the marked information to modify the information.

13. The method claimed in claim 1, wherein the material is paper.

14. The method claimed in claim 1, wherein the number generation portion of the RFID circuit contains a unique identification.

15. The method claimed in claim 1, further including the step of:

placing the (RFID) circuit having a number generation portion that is activated when the RFID circuit is read on objects or in the vicinity of objects.

16. The method claimed in claim 1, wherein the answers to queries represent information about goods.

17. The method claimed in claim 16, wherein the answers to queries represent the date sensitivity of the goods.

18. The method claimed in claim 16, wherein the answers to queries represent the shelf life of the goods.

19. The method claimed in claim 18, wherein the goods are: foods, films, medications and batteries.

20. The method claimed in claim 16, wherein the answers to queries represent when the goods will expire.

21. The method claimed in claim 1, wherein the answers to queries are enclosed in a business reply envelope.

22. The method claimed in claim 1, wherein the answers to queries are attached to a business reply card.

23. The method claimed in claim 1, wherein the answers to queries are part of a business reply card.

24. The method claimed in claim 1, wherein the queries are written on a summons.

25. The method claimed in claim 24, wherein the queries indicate the time the summons was issued.

26. The method claimed in claim 1, wherein the answer to queries are written on a ticket.

27. The method claimed in claim 1, further including the step of:

attaching the material to goods.

28. The method claimed in claim 1, further including the step of:

attaching the material to a container that holds the goods.

* * * * *